(12) United States Patent
Pozzari et al.

(10) Patent No.: US 10,143,333 B2
(45) Date of Patent: Dec. 4, 2018

(54) CONTROL PANEL FOR AN AUTOMATIC MACHINE FOR PREPARING HOT BEVERAGES AND AUTOMATIC MACHINE COMPRISING SUCH A CONTROL PANEL

(75) Inventors: Stefano Pozzari, Como (IT); Roberto Innocenti, Pistoia (IT); Massimo Nostro, Porretta Terme (IT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1111 days.

(21) Appl. No.: 11/989,781

(22) PCT Filed: Apr. 21, 2006

(86) PCT No.: PCT/EP2006/003683
§ 371 (c)(1),
(2), (4) Date: May 14, 2008

(87) PCT Pub. No.: WO2007/014584
PCT Pub. Date: Feb. 8, 2007

(65) Prior Publication Data
US 2009/0084269 A1    Apr. 2, 2009

(30) Foreign Application Priority Data
Aug. 1, 2005 (EP) ................................. 05016688

(51) Int. Cl.
*A23F 5/00* (2006.01)
*A23F 5/24* (2006.01)
(Continued)

(52) U.S. Cl.
CPC ........... *A47J 31/52* (2013.01); *A47J 31/4407* (2013.01)

(58) Field of Classification Search
CPC .. A47J 31/46; A47J 31/56; A47J 31/52; A47J 31/465; A47J 31/4407; A47J 31/002;
(Continued)

(56) References Cited
U.S. PATENT DOCUMENTS 3,983,553 A * 9/1976 Kesling ........................... 341/27
5,959,869 A * 9/1999 Miller et al. ................... 700/231
(Continued)

FOREIGN PATENT DOCUMENTS

CH    693 016 A5    1/2003
EP    1 384 951 A1    1/2004
(Continued)

OTHER PUBLICATIONS

International Search Report for PCT/EP2006/003683 dated Jul. 27, 2006.

*Primary Examiner* — Eric Stapleton

(57) ABSTRACT

A control panel for an automatic machine adapted to prepare hot beverages according to a plurality of formulations comprises: a main input element for receiving inputs from a user; a display element for displaying the inputs to the user through a plurality of input identifiers; a control unit in data communication with the main input element and the display element. The main input element comprises a sense element adapted to detect a motion thereon of a touch of the user the main input element and the display element are in data communication through said control unit so that said motion determines a scrolling through the plurality of input identifiers on the display element, thereby selecting at least one formulation of said plurality of formulations or at least one operation parameter of a plurality of operation parameters of the automatic machine. The control panel has a particular
(Continued)

although not exclusive use for automatic machines for preparing hot beverages, in particular automatic coffee machines for domestic use.

17 Claims, 3 Drawing Sheets

(51) Int. Cl.
  *G09G 5/00* (2006.01)
  *A47J 31/52* (2006.01)
  *A47J 31/44* (2006.01)

(58) Field of Classification Search
  CPC ........... A47J 31/40; A47J 31/41; A23F 5/243; G06Q 20/327; G06Q 20/342; G07F 7/005; G07F 7/025; G07F 13/065
  USPC ........... 99/280–282, 285, 323.3, 450.1, 275; 200/5 R, 600, 296; 345/173–178; 178/18.01, 18.04, 18.06; 715/771; 700/231, 239; 222/1, 148, 129.1
  See application file for complete search history.

(56) References Cited

U.S. PATENT DOCUMENTS

| | | | |
|---|---|---|---|
| 5,997,236 A * | 12/1999 | Picioccio et al. | 414/403 |
| 6,759,072 B1 | 7/2004 | Gutwein et al. | |
| 6,929,149 B2 * | 8/2005 | Selfridge et al. | 221/150 R |
| 7,710,409 B2 * | 5/2010 | Robbin et al. | 345/184 |
| 7,932,897 B2 * | 4/2011 | Elias et al. | 345/174 |
| 2001/0033275 A1 * | 10/2001 | Kent et al. | 345/173 |
| 2003/0076306 A1 | 4/2003 | Zadesky et al. | |
| 2004/0046742 A1 * | 3/2004 | Johnson | 345/168 |
| 2004/0150668 A1 * | 8/2004 | Myers et al. | 345/771 |
| 2004/0202757 A1 * | 10/2004 | Gutwein et al. | 426/433 |
| 2005/0016385 A1 | 1/2005 | Brinkemper et al. | |
| 2006/0032680 A1 * | 2/2006 | Elias et al. | 178/18.06 |
| 2006/0191917 A1 * | 8/2006 | Kang | 219/720 |
| 2007/0157820 A1 * | 7/2007 | Bunn | 99/275 |
| 2007/0200820 A1 * | 8/2007 | Svensson et al. | 345/156 |
| 2007/0273661 A1 * | 11/2007 | Yang et al. | 345/173 |
| 2008/0270218 A1 * | 10/2008 | Scott et al. | 705/10 |

FOREIGN PATENT DOCUMENTS

| | | |
|---|---|---|
| JP | H104193123 A | 7/1992 |
| JP | 2000003652 A | 1/2000 |
| JP | 2002014771 A | 1/2002 |
| JP | 2002520706 A | 7/2002 |
| JP | 2003337649 A | 11/2003 |
| JP | 2005006259 A | 1/2005 |
| JP | 2005038623 A | 2/2005 |
| JP | 2009185763 A | 8/2009 |
| WO | 0112033 A2 | 2/2001 |
| WO | 0112033 A3 | 2/2001 |
| WO | WO 2005096134 A1 * | 10/2005 |

* cited by examiner

CONTROL PANEL FOR AN AUTOMATIC MACHINE FOR PREPARING HOT BEVERAGES AND AUTOMATIC MACHINE COMPRISING SUCH A CONTROL PANEL

CROSS-REFERENCE TO RELATED APPLICATIONS

This application is the U.S. national phase of International Application No. PCT/EP2006/003683, filed 21 Apr. 2006, which designated the U.S. and claims priority to European Patent Application No. 05016688.3, filed 1 Aug. 2005, the entire contents of each of which are hereby incorporated by reference.

DESCRIPTION

The present invention refers, in a first aspect thereof, to a control panel for automatic machines adapted to prepare hot beverages according to a plurality of formulations, particularly, although not exclusively, automatic coffee machines for domestic use.

In a second aspect thereof, the present invention refers to an automatic machine for preparing hot beverages comprising such a control panel.

Throughout the present description and the subsequent claims, the hot beverage to which reference is made is in particular a hot coffee beverage, such as, for example, espresso, regular coffee, coffee filter, long coffee, breakfast coffee, milk and coffee, cappuccino, but can also be hot water alone for preparing tea or other kinds of infusion, hot milk alone, for example plain hot milk or frothed milk, or hot steam.

Some known automatic machines for preparing hot beverages for domestic use are nowadays adapted to prepare a wide range of such beverages, in particular hot coffee beverages such as those mentioned just above. Through a suitable control panel located on the automatic machine a user may select any one of a plurality of hot beverage formulations preset on the machine and/or may directly adjust beverage parameters or set other operation parameters of the machine. Throughout the present description and the subsequent claims, the term "formulation" is used to indicate a set of parameters which define a specific hot beverage and allow preparation thereof by means of the automatic machine. In the case of a hot coffee beverage, these parameters are related to the amounts of coffee, water and, if required, milk in the beverage and to the dispensing temperature thereof. Suitable choice of such amounts allow to obtain different formulations of the hot coffee beverage, such as those mentioned above.

Control panels intended for such automatic machines shall therefore allow the selection and setting of a relatively large number of parameters and, at the same time, an operation of the machine that is as simplex and user-friendly as possible.

Control panels of known automatic machines adapted to prepare hot beverages are provided with one or more input or control elements of the rotary type, such as rotary electromechanical switches or rotary encoders, which allow the user to select a beverage formulation and/or to set beverage or machine parameters by acting on a rotary element, such as a rotary knob, associated to the input or control element.

For example, European patent EP 1 224 894 B1 discloses an automatic coffee machine, in particular an automatic espresso machine, suitable for preparing a hot coffee beverage selectable from a plurality of preparation varieties. The automatic coffee machine is provided with a plurality of switching contact groups, each of which is respectively assigned a preparation variety. The switching contact groups are designed to form components of a lockable rotary selection switch provided with a turning knob, so that one of the switching contact groups can be activated in each lockable rotary position, while the other switching contact groups being locked. The rotary selection switch furthermore comprises an activation element for activating a starting contact, thus triggering the preparation of the variety selected.

European patent EP 1 448 084 discloses a household appliance, namely a household appliance for preparing hot beverages, including at least one control element, at least one displaying element and a program control. Different programs are selectable by means of the control element, each of them having program parameters which can be defined, adjusted, stored and retrieved through an identifier, in particular a user identifier. In a described embodiment the at least one control element is a rotary encoder.

Control panels comprising rotating or moving mechanical parts can suffer from failures due to mechanical wearing over time or to other causes, such as deposit of dirt at the moving parts or oxidation of electric contacts. This can negatively affect or, in the worst case, even prevent the operation of the automatic machine.

The purpose of the present invention is that of providing a control panel for an automatic machine adapted to prepare hot beverages which substantially overcomes the drawbacks of the control panels for automatic machines of the prior art due to the presence of rotating or moving parts, while still maintaining a simple and used-friendly operation.

According to a first aspect thereof, the present invention refers to a control panel for an automatic machine adapted to prepare hot beverages according to a plurality of formulations, comprising:

a main input element for receiving inputs from a user;
a display element for displaying said inputs to said user through a plurality of input identifiers;
a control unit in data communication with said main input element and said display element, wherein said main input element comprises a sense element adapted to detect a motion thereon of a touch of said user and in that said main input element and said display element are in data communication through said control unit so that said motion determines a scrolling through said plurality of input identifiers on said display element, thereby selecting at least one formulation of said plurality of formulations or at least one operation parameter of a plurality of operation parameters of said automatic machine.

The control panel of the invention is thus provided with an input element without rotating or moving mechanical parts. In fact, the main input element responds to motions of the user's touch on the sense element associated thereto, which element is stationary. The sense element senses these motions and converts them into suitable signals, typically electric signals. These signals can be processed through the control unit, which is in data communication with the main input element and the display element, for determining a scrolling, corresponding to the motion detected, through the input identifiers on the display element and allowing the desired selection on the automatic machine to be performed. Thus, the control panel of the invention substantially overcomes the drawbacks mentioned above with reference to the control panels of the prior art.

Furthermore, the control panel of the invention has a simple and user-friendly operation, since selection or setting operations can be intuitively and easily performed and their effect can be visualized substantially in real time. Through the control panel of the invention, selection and setting operations on the automatic machine can be normally performed using just one finger.

The sense element comprises a capacitive sensor. Capacitive sensors are generally adapted to detect single touches as well as to track continuous motions of a touch thereon, producing in response electric signals, which can be easily used, through a proper control provided by the control unit, to perform scrolling through the input identifiers for selecting a beverage formulation as well as to set operation parameters of the automatic machine.

The sense element can be shaped into different shapes, depending on the kind of motion which is desired to be done by the user when performing a selection or setting operation, or on the layout of the control panel.

In an embodiment of the invention, the sense element is substantially ring-shaped. In this case, the sense element reports the angular positions of the user's touch around it and its motions along the ring path. This shape allows a simple implementation of a circular scrolling through the input identifiers on the display element. Throughout the present description and the subsequent claims, the term "circular scrolling" is used to indicate a continuous scrolling through a list of items, such as the aforementioned input identifiers, wherein to the last item of the list follows in a loop the first item of the list, such scrolling being attainable by continuously acting on an input element in a same direction of motion or rotation.

In an alternative embodiment, the sense element can be substantially straight-shaped. In this case, the sense element reports the linear position and motions of the user's touch along the main axis of the sense element.

The control panel of the invention comprises an activation element adapted to activate the preparation of a hot beverage according to the formulation selected from said plurality of formulations or to set an operation parameter of said plurality of operation parameters of the automatic machine.

The activation element is provided in proximity of said sense element. This allows a prompt operation of the actuation element after a selection operation is made through the main input element.

In the embodiments where the sense element is ring-shaped, the activation element is provided at a portion of the control panel spatially delimited by the sense element.

The activation element comprises a capacitive sensor. As mentioned above, capacitive sensors are adapted to report the touch of the user thereon and can be used, in the form of capacitive buttons, to replace electromechanical switches, avoiding the drawbacks already mentioned with reference to the presence of moving mechanical parts.

In an embodiment of the invention, the sense element comprises a plurality of sensing portions spaced apart from each other and the control panel comprises an acoustic signaling device emitting an acoustic signal while the touch of said user moves on said sense element passing from one of said sensing portions to another. The acoustic signals produced by the acoustic signaling device replace the tactile effect which could be given by the actuation of a rotary knob and provide an immediate indication to the user of the motion on the sense element. The acoustic signaling device is of conventional type and can be for example provided in the form of buzzers.

The acoustic signaling device is adapted to emit a first acoustic signal when the motion on the sense element is in a first direction, and a second acoustic signal different from the first acoustic signal, when the motion on the sense element is in a second direction opposite to the first direction. The user can thus better perceive the direction, either circular or linear according to the shape of the sense element, of the motion of his own touch on the sense element.

In an embodiment, the control panel comprises at least one auxiliary input element adapted to switch the operation of said main input element between at least a first set and a second set of said plurality of formulations.

The at least one auxiliary input element allows to use one main input element to perform a selection through different sets of formulations of a hot beverage, such as, for example, sets related to the strength and to the size of the hot beverage.

The at least one auxiliary input element is in data communication with the display element through the control unit.

Said at least one auxiliary input element comprises a capacitive sensor.

The acoustic signaling device is adapted to emit an acoustic signal also when the capacitive sensors associated to the activation element and/or to the at least one auxiliary input element are activated.

In an embodiment, the control panel comprises a substantially flat front surface. The absence of elements projecting from the front surface of the control panel limits the overall dimensions of the control panel and makes the cleaning thereof easier. Furthermore, damages to the control panel due to impacts against projecting elements located thereon are avoided.

The front surface of the control panel is covered by a single protective layer. This allows a better preservation of the control panel against clearing and deposit of dirt. The protective layer can be made from any suitable material such as, for example, plastic.

According to a second aspect thereof, the present invention refers to an automatic machine for preparing hot beverages, in particular an automatic coffee machine, comprising a control panel having the features outlined above. Such an automatic machine has all of the features discussed above with reference to the control panel of the invention, in particular in terms of reliability and ease of use.

Additional features and advantages of the present invention shall become clearer from the following description of an embodiment thereof, given hereafter, for indicating and not limiting purposes, with reference to the attached drawings. In such drawings.

In such figures a control panel according to the present invention is generally indicated at 100. The control panel 100 is particularly, although not exclusively, intended for an automatic machine 200 adapted to prepare hot beverages according to a plurality of formulations, in particular automatic coffee machines for domestic use. The automatic machine 200 is per se known and is not described here in detail.

Figure 2:
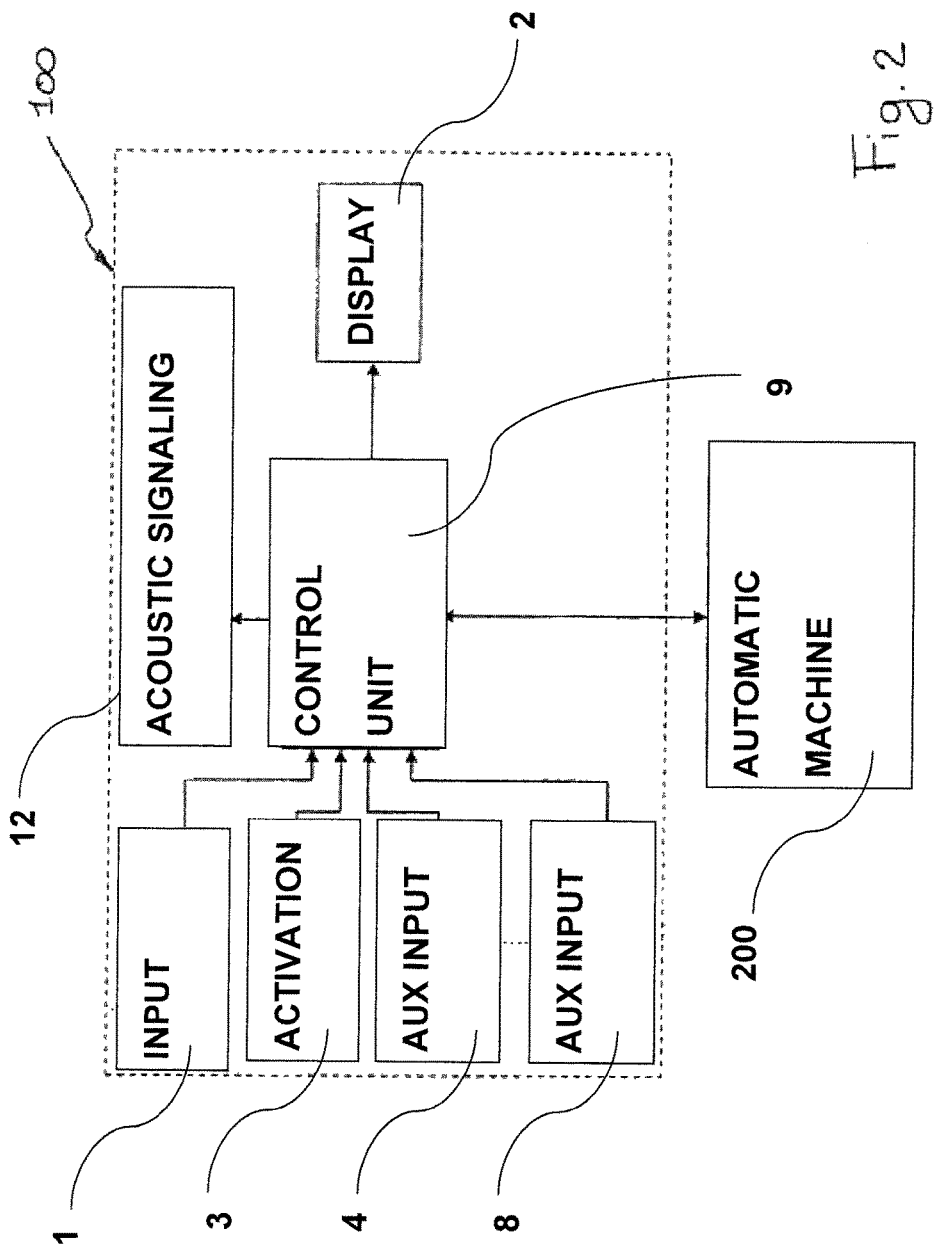
FIG. 2 is a block diagram which schematically shows the operation of the control panel of FIG. 1.
Figure 3:
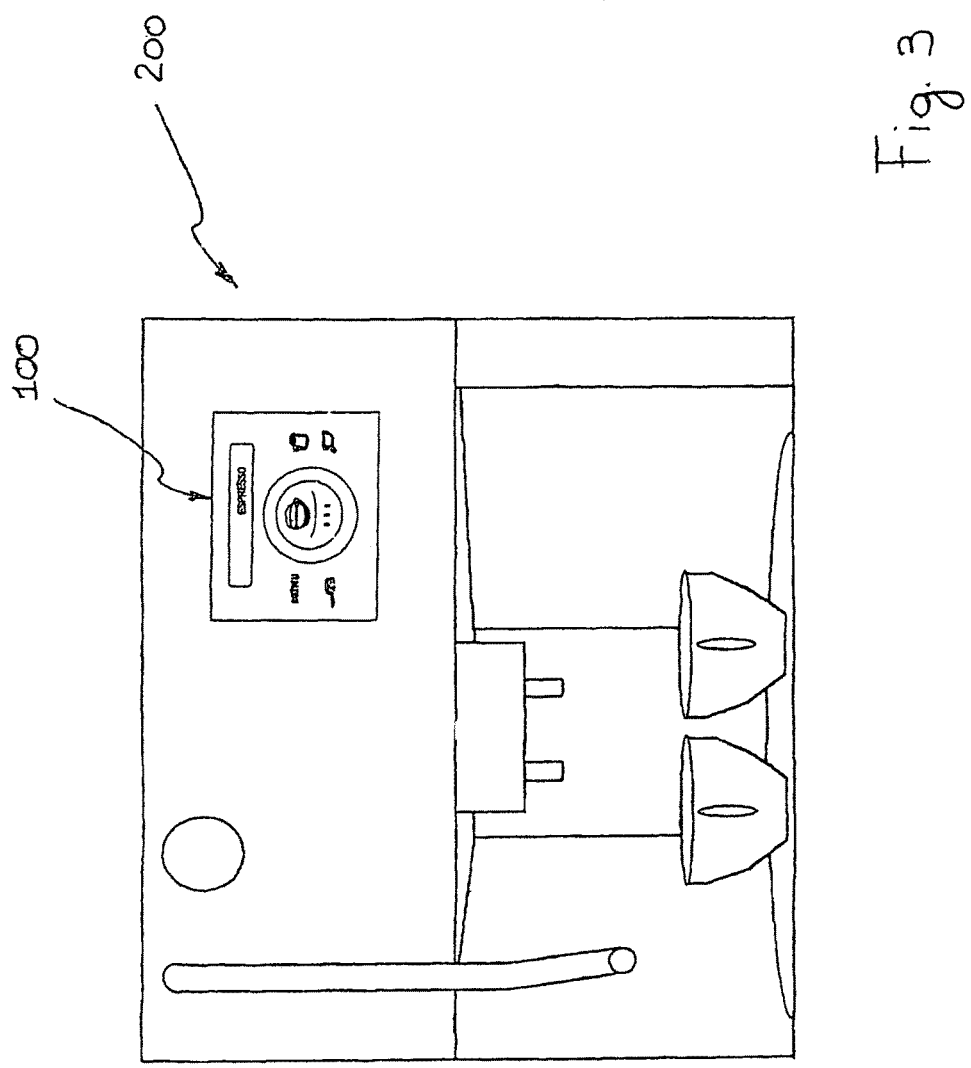
FIG. 3 is a front view of an automatic machine for preparing hot beverages comprising the control panel of FIG. 1.

The control panel 100 comprises a main input element 1, a display element 2, an activation element 3, auxiliary input elements 4, 5, 6, 7 and 8 and a control unit 9 (shown only in FIG. 2).

The main input element 1 is adapted to receive inputs from the user to perform selections of a beverage formulation, as well as of a machine operation parameter. The inputs from the user are displayed to the user on the display element 2 through a plurality of input identifiers 21. The input identifiers 21 can be grouped, for example on the basis of the kind of beverage or of the kind of settable parameter, into one or more sets or lists, which can be displayed as different menus. In the case of more then one set, some or all of them can be hierarchically structured.

According to the invention, the main input element 1 comprises a sense element 11 made up of sensing portions 11a and not-sensing portions 11b adapted to detect the motion thereon of a user's touch, typically the touch of a finger. The main input element 1 is in data communication with the display element 2 through the control unit 9 so that the motion detected on the sense element 11 determines a scrolling through the input identifiers 21 on the display element 2, thus allowing the user to perform the desired selection on the automatic machine 200.

The sense element 11 is totally stationary and comprises a capacitive sensor which senses the motions of the user's touch thereon and converts them into electric signals. These electric signals are processed by the control unit 9 and sent to the display element 2 for determining a scrolling through the input identifiers, on the basis of the motion detected. In the embodiment shown in FIG. 1, the sense element 11 is substantially ring-shaped. In this form, which is sometimes known in the art with the term "touch wheel", the sense element 11 is particularly adapted for implementing a circular scrolling through the input identifiers 21 or sets thereof. However, the sense element 11 can also have different shapes, for example a straight shape, and still allow a circular scrolling through a suitable control thereof.

The functioning of the main input element 1 is controlled by the control unit 9 in a way known to those skilled in the art. In particular, using a suitable control program the sense element 11 is virtually subdivided into a plurality of sensing portions 11a; the sensing portions 11a are spaced apart from each other by a plurality of not-sensing portions 11b. In the embodiment shown in FIG. 1 four sensing portions 11a alternated with four not-sensing portions 11b are represented by means of dashed lines; the sensing and not-sensing portions 11a, 11b substantially coincide with angular sectors of the ring-shaped sense element 11 and have substantially the same angular extension.

The number and extension of the sensing and not-sensing portions 11a, 11b are defined by the control program on the control unit 9. These features are defined in a parametric way, so as to easily allow a control of input elements 1 comprising sense element 11 of different sizes. In general, the bigger is the number of sensing portions 11a the higher is the resolution of the sense element 11, but the same is more subjected to misdetection of touch motions thereon. A low number of sensing portions 11a limits the possibility of misdetections, but makes the sense element 11 less sensitive, thus forcing the user to make larger movements in order that a touch motion is detected by the sense element 11.

The display element 2 is of conventional type, such as, for example, a liquid crystal display (LCD), a LED display, a dot matrix display or a segment display, and is adapted to display alphanumeric characters and graphic symbols, individually or in combination. The shape and size of the display element 2 may vary according to the needs. In the embodiment shown in FIG. 1 the display element 2 has a substantially straight shape and is designed to allow the simultaneous visualization of at least two rows of characters or symbols.

The activation element 3 is provided in proximity of the input element 1, for example at a portion of the control panel 100 spatially delimited by the ring-shaped sense element 11 itself, and comprises a capacitive sponsor 31 in the form of a capacitive button actuatable by the touch of the user. The activation element allows to start the preparation of a hot beverage according to a selected formulation or to confirm the setting of an operation parameter of the automatic machine 200 after a selection has been made through the main input element 1 and/or the auxiliary input elements 4, 5, 6 and 7.

The auxiliary input elements 4, 5, 6 allow to switch the operation of the main input element 1 among different sets of hot beverage formulations, displaying and making scrollable corresponding different sets of input identifiers 21 on the display element 2. In particular, in the embodiment of the control panel 100 here illustrated, the auxiliary input element 4 is a beverage strength button, which allows to select the strength of the hot beverage; particularly of the hot coffee beverage; the auxiliary input element 5 is an added milk button, which allows to select hot beverages formulations comprising milk; the auxiliary input element 6 is a hot water button for producing hot water or steam. The auxiliary input element 7 is a menu button, which allows to enter a machine program mode for setting operation parameters of the automatic machine 200 and/or define personalized hot beverage formulations. The auxiliary input element 8 is a pregrinded coffee option button, which allow to directly use pregrinded coffee for preparing a hot coffee beverage instead of activating the grinding of coffee-beans previously loaded into a suitable reservoir of the automatic machine 200. The aforementioned auxiliary input elements comprise respective capacitive sensors 41, 51, 61, 71 and 81 in the form of a capacitive buttons actuatable by the touch of the user.

The control panel 100 further comprises an acoustic signalling device 12 (shown only in FIG. 2), for example a buzzer, adapted to emit an acoustic signal when the main input element 1 is actuated, i.e. when the touch of the user moves on the sense element 11 passing from one to another of the sensing portions 11a. The acoustic signalling device emits a first acoustic signal when the motion on the sense element 11 is in first direction, e.g. clockwise, and a second acoustic signal, different from the first acoustic signal, when the motion on the sense element 11 is in a second direction opposite the said first direction, e.g. counter-clockwise. In an embodiment of the invention, an acoustic signal is also emitted when the activation element 3 and/or any of the auxiliary input elements 4, 5, 6, 7 and 8 is actuated.

Backlighting of the main input element 1, of the activation element 3 and of the auxiliary input elements 4, 5, 6, 7 and 8 can be provided in a conventional manner known to those skilled in the art, for example by means of LEDs. This enhances operability of the control panel 100 and of the automatic machine 200 in case of low external lighting conditions.

The main input element 1, the display element 2, the activation element 3 and the auxiliary input elements 4, 5, 6, 7 and 8 are arranged on the control panel 100 in an ergonomically and visually convenient manner. Of course, the relative position on the control panel 100 of such elements may be changed with respect to that shown in FIG.

1 to satisfy specific technical and/or aesthetic needs without departing from the scope of the invention.

As schematically shown in FIG. 2, the main input element 1, the activation element 3 and the auxiliary input elements 4, 5, 6, 7 and 8 are in data communication with the control unit 9, which is in turn in data communication with the display element 2, the acoustic signalling device and various devices (not explicitly shown) of the automatic machine 200. The data communication is physically established in a conventional way, typically by means of integrated electronic circuits.

The main input element 1, the display element 2, the activation element 3 and the auxiliary input elements 4, 5, 6, 7 and 8 are arranged on a single printed circuit board (PCB). This makes the assembling procedure of the control panel 100 on the automatic machine 200 easier and faster.

The control panel 100 has a substantially flat front surface, which is in particular covered by a single protective layer 13, such as, for example, a plastic layer of suitable thickness.

For immediate identification of the functions of the activation element 3 and of the auxiliary input elements 4, 5, 6, 7 and 8, suitable identifiers, in the form of graphic symbols and/or text, are provided on the control panel in particular where the respective capacitive sensors 31, 41, 51, 61, 71 and 81 are located. Such identifiers can be defined on the protective layer 13 or on a different layer interposed between the front surface of the control panel 100 and the protective layer 13.

Figure 1:
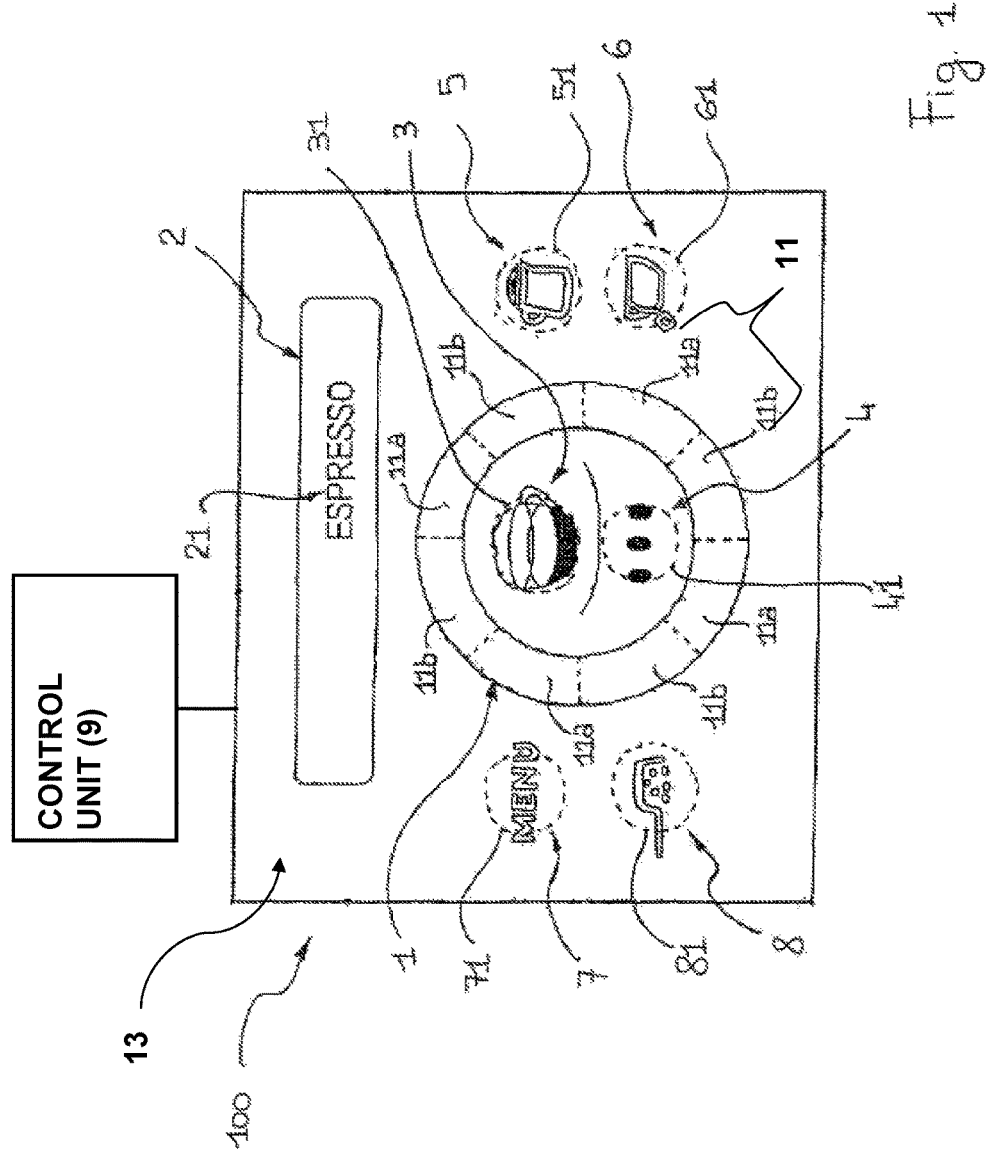
FIG. 1 is a front view of a control panel for an automatic machine adapted to prepare hot beverages according to an embodiment of the invention.

The use of the control panel 100 to operate the automatic machine 200 is hereafter described with reference to the embodiment thereof shown in FIG. 1.

When the automatic machine 200 is switched on and ready for operation, the user can act on the main input element 1 to select a hot beverage formulation. If none of the auxiliary input elements 4, 5, 6, 7 has been previously activated, the selection occurs among hot beverages formulations containing coffee only. By touching the sense element 11 of the main input element 1 in any point thereof and then moving his finger along it, the user determines a scrolling on the display element 2 through input identifiers of hot beverages containing coffee only, which identify different coffee sizes, such as, for example, espresso, regular coffee, coffee filter, long coffee, etc.

The desired formulation (coffee size, in this case) is selected by making the respective input identifier to appear on the display element 2 through scrolling. The user may then stop moving his finger on the sense element 11 on the main input element 1 and touch the activation element 3 to start the preparation of the beverage.

Besides selecting the size of the coffee beverage as described above, the user may desire to change the beverage strength. For this purpose he can activate the auxiliary input element 4 (beverage strength button). The operation of the main input element 1 is then switched to the set of formulations related to beverage strength. Acting on the sense element 11 as described above, the user determines a scrolling on the display element 2 through corresponding input identifiers such as, for example, strong, normal, mild, etc.

Once the desired formulation (beverage strength, in this case) has been selected, the user may stop moving his finger on the sense element 11 of the main input element 1 and touch again the auxiliary input element 4 to switch back the to the set of formulations related to the coffee beverage size or directly the activation element 3 to start the preparation of the beverage.

If the user desires a hot coffee beverage formulation containing milk, he may activate the auxiliary input element 5 (added milk button). The operation of the main input element 1 is then switched to a set of formulations of hot beverages containing coffee and milk. Acting on the sense element 11 as described above, the user determines a scrolling on the display element 2 through corresponding input identifiers such as, for example, latte macchiato, cappuccino, milk and coffee, hot milk, etc.

Once the desired formulation (which, in this case, define a specific relative amount of coffee and milk in the beverage) has been selected, the user may stop moving his finger on the sense element 11 of the main input element 1 and touch the activation element 3 to start the preparation of the beverage or touch the auxiliary input element 4 to preform a further selection of the beverage strength as described above. A further touch on the auxiliary input element 5 determines the operation of the main input element 1 to be switched back the to the set of formulations related to coffee beverage size. A protracted touch on the auxiliary input element 5, for example for more than 2 seconds, allows the dispensing of extra hot milk.

By activating the auxiliary input element 6 (hot water button) hot water or steam can be dispensed, for example for preparing tea or infusions.

The activation of the auxiliary input element 7 (menu button) allows to enter a machine program mode for setting operation parameters of the automatic machine 200 and/or define personalized hot beverage formulations, which setting can be done through the main input element 1. A further touch on the auxiliary input element 7 determines the operation of the main input element 1 to be switched back the to the set of formulations related to coffee beverage size.

The activation of the auxiliary input element 8 (pre-grinded coffee option button) allows to directly use pre-grinded coffee instead of activating the grinding of coffee-beans previously loaded into the automatic machine 200 for preparing a hot coffee beverage.

The invention claimed is:

1. An automatic beverage machine adapted to prepare hot beverages according to a plurality of different beverage formulations that define a specific hot beverage and parameters related to dispensed quantities of the hot beverage, the automatic beverage machine comprising:

a main input element configured to receive input from a user;

a display element configured to display input options to said user in a form of a plurality of input identifiers;

a plurality of auxiliary input elements each simultaneously configured to receive input from a user, wherein a first one of said plurality of auxiliary input elements is configured to receive a selection of at least one beverage formulation and a second one of said plurality of auxiliary input elements is configured to receive a selection to enter a machine program mode for setting operation parameters of said automatic machine separate and distinct from a beverage formulation and a dispensed quantity of the hot beverage;

a control unit in data communication with said main input element, said plurality of auxiliary input elements and said display element, wherein said main input element comprises a sense element configured to detect a motion thereon of a touch of said user, said control unit configured to receive a signal from said sense element in response to said motion to produce a displayed scrolling through said plurality of input identifiers on said display element, and thereby said control unit being enabled to receive from said sense element a selection of at least one beverage formulation of said plurality of beverage formulations and by said second one of said plurality of auxiliary input elements the selection to enter the machine program mode, wherein said control unit is further configured to provide on said display element at least a selectable first one of said plurality of input identifiers related to said plurality of beverage formulations and a selectable second one of said plurality of input identifiers related to said setup of said automatic beverage machine separate and distinct from the beverage formulation and said dispensed quantity of the hot beverage.

2. The automatic beverage machine according to claim 1, wherein said sense element comprises a capacitive sensor.

3. The automatic beverage machine according to claim 1, wherein said sense element is substantially ring-shaped.

4. The automatic beverage machine according to claim 3, comprising an acoustic signaling device emitting an acoustic signal while the touch of said user moves on said sense element passing from one of said sensing portions to another, wherein said acoustic signaling device is adapted to emit a first acoustic signal when the motion on said sense element is in a clockwise direction, and a second acoustic signal different from said first acoustic signal, when the motion on said sense element is in a counter-clockwise direction.

5. The automatic beverage machine according to claim 1, comprising an activation element adapted to activate the preparation of a hot beverage according to the beverage formulation selected from said plurality of beverage formulations or to set an operation parameter of said plurality of operation parameters of said automatic machine.

6. The automatic beverage machine according to claim 5, wherein said activation element is provided next to said sense element.

7. The automatic beverage machine according to claim 6, wherein said sense element is substantially ring-shaped and said activation element is provided at a portion of said automatic beverage machine spatially delimited by said sense element.

8. The automatic beverage machine according to claim 5, wherein said activation element comprises a capacitive sensor.

9. The automatic beverage machine according to claim 1, wherein said sense element comprises a plurality of sensing portions spaced apart from each other and wherein said automatic beverage machine comprises an acoustic signaling device emitting an acoustic signal while the touch of said user moves on said sense element passing from one of said sensing portions to another.

10. The automatic beverage machine according to claim 9, wherein said acoustic signaling device is adapted to emit a first acoustic signal when the motion on said sense element is in a first direction, and a second acoustic signal different from said first acoustic signal, when the motion on said sense element is in a second direction opposite to said first direction.

11. The automatic beverage machine according to claim 1, comprising at least one auxiliary input element adapted to switch the operation of said main input element between at least a first set and a second set of said plurality of beverage formulations.

12. The automatic beverage machine according to claim 11, wherein said at least one auxiliary input element comprises a capacitive sensor.

13. The automatic beverage machine according to claim 11, wherein said at least one auxiliary input element comprises a graphic symbol provided where the capacitive sensor is located.

14. The automatic beverage machine according to claim 1, comprising a substantially flat front surface.

15. The automatic beverage machine according to claim 1, wherein said main input element and said display element together are covered by a single protective layer.

16. The automatic beverage machine according to claim 1, wherein said sense element is substantially ring-shaped and comprises a plurality of non-sensing portions spaced apart from each other by a plurality of sensing portions and wherein the sensing and non-sensing portions substantially coincide with angular sectors of said main input element and the sensing and non-sensing portions have substantially a same angular extension.

17. The automatic beverage machine according to claim 1, wherein said sense element comprises a plurality of sensing portions spaced apart from each other and a size of said sensing portions is programmable as one of the plurality of operation parameters.

* * * * *